No. 717,700.  
PATENTED JAN. 6, 1903.  
A. P. MURDOCH.  
PROCESS OF MANUFACTURING STARCH.  
APPLICATION FILED APR. 14, 1902.  
NO MODEL.
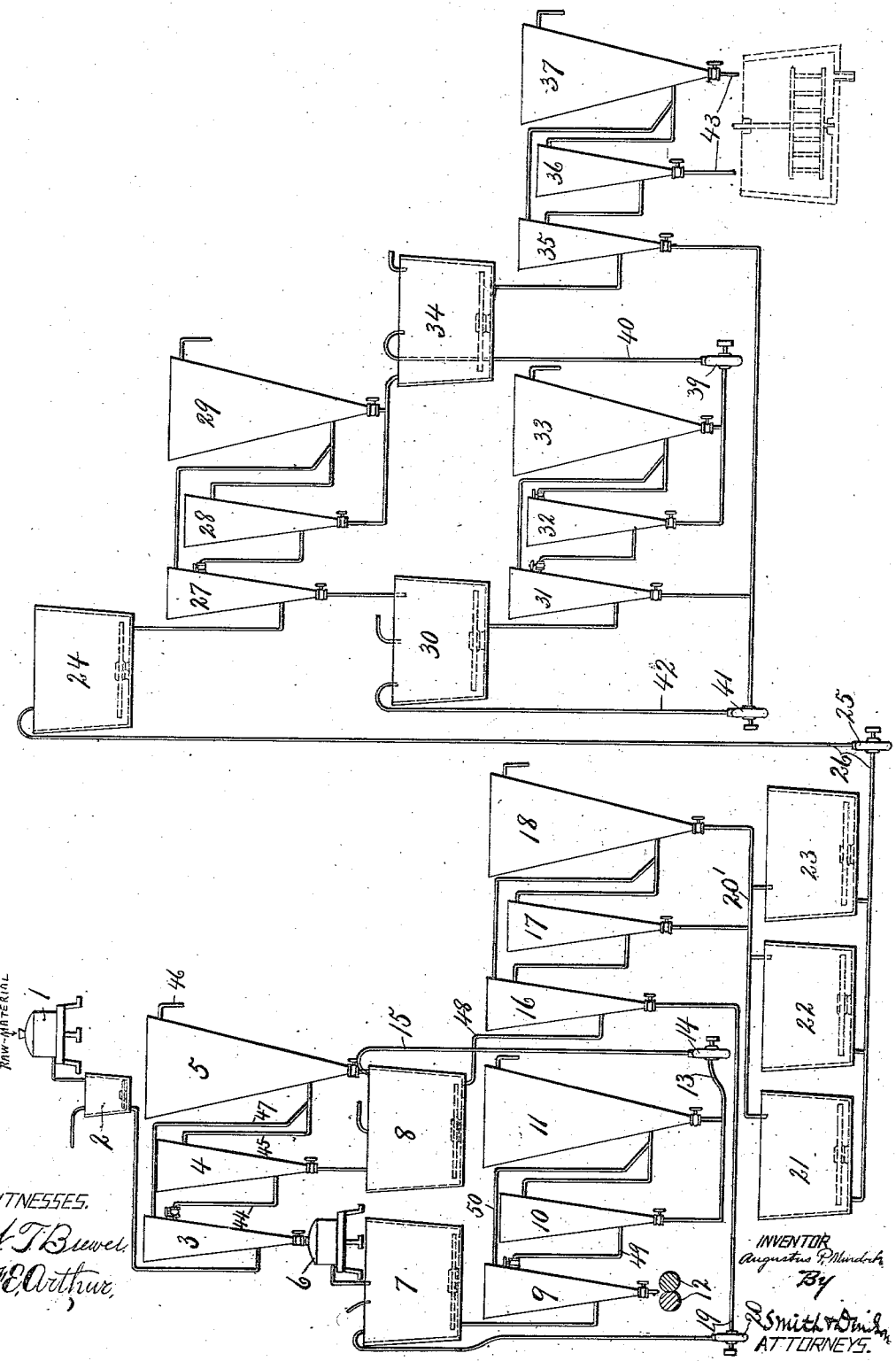
WITNESSES.  
INVENTOR  
Augustus P. Murdoch  
By  
Smith & Davis  
ATTORNEYS.

UNITED STATES PATENT OFFICE.

AUGUSTUS P. MURDOCH, OF OSWEGO, NEW YORK.

PROCESS OF MANUFACTURING STARCH.

SPECIFICATION forming part of Letters Patent No. 717,700, dated January 6, 1903.

Application filed April 14, 1902. Serial No. 102,777. (No specimens.)

*To all whom it may concern:*

Be it known that I, AUGUSTUS P. MURDOCH, of Oswego, in the county of Oswego, in the State of New York, have invented new and useful Improvements in Processes of Manufacturing Starch, of which the following, taken in connection with the accompanying drawings, is a full, clear, and exact description.

My invention relates to an improved process of manufacturing starch.

One of the objects of this process is to render the production of starch continuous and substantially automatic from the first introduction of the raw material to the final discharge of the finished starch product and at the same time to concentrate and separate the feed or coarser product from the starch liquor without the employment of any screens, sieves, or other bolting devices.

Another object is to obviate the use of "runs" or tables and other devices which are expensive, occupy a great deal of floor-space, and require the continuous attendance of several attendants night and day to keep the liquor properly agitated in order that the light non-farinaceous substance may be kept at the surface to flow off with the gluten-water and to shovel the precipitate starch into suitable conveyers.

Another object is to first prepare the starch liquor for the mixing-tanks, where the dilute chemical is introduced, and then continue the flow of the starch liquor, with the dilute chemical added, through a series of inverted conical vats until it finally issues from the last vat in the form of commercial starch, ready to be boxed.

A further object is to reduce the coarser matter as it passes through the first conical vat and to press or dry the same to be used as fodder or for other purposes.

A still further object is to return the starch liquor from the first series of vats to suitable washing-tanks receiving the discharge from said first series of vats, to be again conducted through one or more additional series of inverted conical vats before conducting the starch liquor to the chemical-tanks.

To this end the invention consists in the various steps of the process, as hereinafter described, and pointed out in the claims.

In the drawings I have shown a system of apparatus identical with that set forth in my pending application, Serial No. 86,972, filed December 23, 1901, and consisting of a mill 1, an agitator-tank 2, a series of inverted conical vats 3, 4, and 5, a second mill 6 for receiving the coarser matter, as the feed from the vat 3, and additional agitator-tanks 7 and 8, the tank 7 receiving the discharge from the mill 6 and the tank 8 receiving the discharge from the apexes of the vats 4 and 5.

Connected to the tank 7 is a second series of inverted conical vats 9, 10, and 11, the vat 9 receiving the material directly from the tank 7 and is connected to discharge the starch liquor through the vat 10 to the vat 11. At the apex of the vat 9 are presser-rollers 12, which receive the coarser product or feed from the vat 9 for the purpose of pressing the moisture therefrom and preparing the same for fodder or other uses. The vats 10 and 11 discharge their precipitate into the conduit 13, from which it is drawn by a suitable pump 14 and forced through a conduit 15 into the vat 8.

Connected to the tank 8 is a third series of inverted conical vats 16, 17, and 18, which discharge the starch liquor successively from one to the other from the vat 16.

In order to insure the thorough removal of the non-farinaceous material, I preferably return the material discharged from the apex of the vat 16, by means of a conduit 19 and pump 20, to the vat 7, from which it is again fed through the vats 9, 10, and 11, thence into the tank 8 and again into the vats 16, 17, and 18, the starch liquor being by this time nearly free from non-farinaceous substance, and the starch is held in suspension in the water and flows from the vat 16 into the vats 17 and 18, from which it is discharged through a suitable conduit 20' into mixing-tanks 21, 22, and 23. Here the starch liquor is treated with suitable chemicals to purify the same and is then conducted to a tank 24 by means of a pump 25 and conduits 26.

Connected to the vat 24 is a fourth series of inverted conical vats 27, 28, and 29, which are connected to run the liquor successively from one to the other, the vat 27 being connected directly to the tank 24. The apex of the vat 27 is arranged to discharge into a tank 30, which discharges into a fifth series of inverted conical vats 31, 32, and 33, while the vats 28 and 29 are arranged to discharge into the tank 34, from which the liquor is discharged into a sixth series of inverted conical vats 35, 36, and 37. The vats 31, 32, and 33 also discharge successively from one to the other, and in the treatment of some classes of starch-containing matter the starch may be boxed directly from the vat 31. The starch from the apexes of the vats 32 and 33 is also preferably conducted by means of a pump 39 and conduit 40 to the tank 34, it being again fed through the vats 35, 36, and 37, and in order to finally insure the conversion of the precipitate of the vats 31 and 35 into starch I preferably conduct the discharge from the apex of said vats 31 and 35 to the vat 30 by means of a pump 41 and conduit 42, thus creating a circulation of the starch liquor from the vats 31 and 35 through the tank 30, vats 31, 32, and 33, and tank 34, and the overflow of the starch liquor in the tanks 35, 36, and 37 finally issues at the apexes of the vats 36 and 37 in the form of starch, which may be boxed directly from either of said vats or conveyed to any desired locality by conduits 43 for the purpose of boxing the same.

I have thus briefly described the apparatus for carrying out my process. This process consists, essentially, in first macerating or grinding the raw material in the mill 1, then conducting the same to the agitator-tank 2, where it is mixed with a suitable quantity of water and agitated and then conveyed to the base of the vat 3, in which vat the liquid mash is expanded upwardly, thereby causing a partial separation of the mash into three constituent elements—viz., the coarser product or feed, the starch liquor, and, third, the gluten-water and oil or matter of lightest specific gravity. The coarser material or feed being of the heaviest specific gravity is precipitated into the apex of the vat 3, while the starch liquor being of less specific gravity forms an intermediate strata of liquor, and the gluten-water or oil being of still less specific gravity rises to the surface. The coarser product or feed at the base of the vat 3 is then drawn off into the second mill 6, where it is again ground or macerated to a finer condition than when issuing from the mill 1 and is discharged into the vat 7. Additional water is then added for further washing the feed, so as to separate the farina from the non-farinaceous substance, and then the material is agitated and flows into the vat 9. The coarser or non-farinaceous material is precipitated through the apex of the vat 9 and is then pressed or dried by the rollers 12 to be used as fodder or as a fertilizer.

I have thus far described the various steps of separating the feed from the starch liquor, and I will now proceed to describe the process of treatment of the starch liquor, which, as previously stated, rises to an intermediate level in the vat 3 and flows therefrom through a conduit 44 to the base of the vat 4, the starch liquor rising to an intermediate level in said vat and is conducted therefrom through a conduit 45 to the base of the vat 5, which is preferably of greater capacity than the vats 3 or 4 in order that the flow of liquor therethrough may be slower and therefore afford better opportunity for the starch to precipitate or separate from the water, which water overflows from the top of the vat 5 through a conduit 46 and is allowed to go to waste, as it is after this treatment substantially free from starch. In order to recover any starch which may be held in suspension by the gluten-water in the upper level in the vat 3, I preferably conduct the same through a conduit 47 to the base of the vat 5, in which the starch is found to be entirely separated from the water and precipitated through the apex into the tank 8, the vat 4 also discharging its coarser product through its apex into said vat 8. Here additional water is introduced into the starch liquor in the vat 8 and is suitably agitated and then flows into the base of the vat 16 through a conduit 48, where it is again expanded, and the heavier matter, which is now mostly starch and may contain some non-farinaceous or glutinous substance, is precipitated through the apex of the vat 16 and into the conduit 19 and returned to the vat 7. The operation of removing the non-farinaceous substance is then repeated through the vat 9, the heavier matter passing to the rollers 12, and the starch liquor flows from the intermediate level of the vat 9 to the vat 10 through a conduit 49 and is expanded upwardly therein. In the same manner the starch liquor is conveyed from the intermediate portion of the vat 10 to the vat 11, the heavier matter being precipitated through the apexes of both the vats 10 and 11 into the conduit 13 and is then returned to the tank 8 for the purpose of again treating the material by running the same through the vats 16, 17, and 18. The gluten water or liquor of lightest specific gravity overflows from the vat 9 through a conduit 50 and into the base of the vat 11 in the same manner and for the same purpose that the gluten-water is drawn from the upper level of the vat 3 to the base of the vat 5.

The operation of passing the liquor through each series of the vats being substantially the same, it will be unnecessary to describe in detail the exact course of the liquor through each of the remaining series, it being sufficient to state that the liquor after being agitated in the tank 8 flows through the vats 16, 17, and 18 continuously, and the heavier matter is discharged from the vats 17 and 18 into the mixing-tanks 21, 22, and 23. The liquor is then chemically treated in the vats to remove any impurities and to liberate the gluten and is properly agitated and then conveyed to the vat 24, in which the liquor is again agitated, and conveyed through the series of vats 27, 28, and 29. The heavier matter in the vat 27 flows through its apex into the tank 30, where it is agitated and additional water added, and then discharged into the fifth series of vats 31, 32, and 33, the remaining vats 28 and 29 discharging through their apexes into the tank 34, where additional water is introduced and the liquor agitated and conveyed to the sixth series of vats 35, 36, and 37, the heavier material or precipitated starch in the vat 35 being conveyed to the tank 30, and from this tank 30 it is run through the vats 31, 32, and 33 and then conveyed to the tank 34, the liquor being then conveyed to the vats 35, 36, and 37 and the starch drawn off from the apexes of the vats 36 and 37 in condition to box.

The several steps in the process will now be readily understood upon reference to the foregoing description, and it will be noted that a less number of series of vats may be employed and that a less number for each series may also be used in the preparation of starch from some kinds of raw material. Therefore I do not limit myself to the precise number of vats for each series nor to the precise number of series of vats.

Having thus described my invention, what I claim, and desire to secure by Letters Patent, is—

1. The process of producing starch consisting in introducing a liquid mash into an inverted conical vat, drawing off the precipitate through the apex of the vat, conducting the liquid from the intermediate level of the vat into the base of a second inverted conical vat, and simultaneously drawing off the liquid from the upper level of the second vat and collecting the discharge from its apex.

2. The process of producing starch consisting in introducing a liquid mash into an inverted conical vat, drawing off the precipitate through the apex of the vat, conducting the liquid from the intermediate level of the vat into the base of a second inverted conical vat, and simultaneously drawing off the liquid from the upper levels of both of said vats into the base of a third inverted conical vat, and collecting the residue of the first vat separately from that of the other two vats.

3. The process of producing starch consisting of flowing portions of the starch containing matter successively through a series of inverted conical vats, collecting and macerating the discharge of the precipitate of the first vat of the series and collecting together the discharge of the precipitate of the other vats of the series.

4. The process of producing starch consisting of flowing portions of the starch containing matter successively through a series of inverted conical vats, collecting and macerating the discharge of the precipitate of the first vat of the series, washing and agitating the macerated material and flowing portions of the same successively through a second series of inverted conical vats, pressing the precipitate from the first vat of the second series, and collecting together the precipitate from the remaining vats of both series.

5. The process of producing starch consisting of flowing portions of the starch containing matter successively through a series of inverted conical vats, collecting and macerating the discharge of the precipitate of the first vat of the series and collecting together the discharge of the precipitate of the other vats of the series and running portions of the same through a second series of inverted conical vats, and then collecting the precipitate from the first vat of the second series together with the macerated matter of the first vat of the first series.

6. The process of producing starch consisting of flowing portions of the starch containing matter successively through a series of inverted conical vats, collecting and macerating the discharge of the precipitate of the first vat of the series and collecting together the discharge of the precipitate of the other vats of the series and running portions of the same through a second series of inverted conical vats, and then collecting the precipitate from the first vat of the second series together with the macerated matter of the first vat of the first series and then passing portions of the second collection through a third series of inverted conical vats.

7. The process of producing starch consisting of macerating and liquefying the raw starch-containing material and flowing the same successively through a series of inverted conical vats, collecting, washing and agitating the precipitate from one of the vats in a single tank, then continuing the flow of the agitated matter through a second series of inverted conical vats, and then collecting the starch liquor and chemically treating the same, the flow of the material from the first step to the last being continuous.

8. The process of producing starch consisting of macerating and liquefying the starch-containing material then causing the same to flow continuously and successively through a series of inverted conical vats, collecting and macerating the precipitate from the first vat of the series, simultaneously collecting the precipitate from the remaining vats, and flowing the same continuously to a mixing-tank and there chemically treating and purifying the same, and then washing the latter product and flowing the same through an additional series of inverted conical vats.

9. The herein-described process of producing commercial starch automatically and continuously consisting of macerating and liquefying the starch-containing material and flowing portions of the same continuously and successively through a plurality of series of inverted conical vats, washing and mixing the continuously-flowing product during its transit from one series to the other, collecting and remacerating the precipitate from the first vat of the first series and finally collecting and boxing the starch directly from the last vat of the last series.

In witness whereof I have hereunto set my hand this 7th day of April, 1902.

AUGUSTUS P. MURDOCH.

Witnesses:
L. W. BAKER,
E. H. FOLEY.